J. E. RUBY.
ANIMAL TRAP.
APPLICATION FILED JUNE 25, 1913.
1,116,127.
Patented Nov. 3, 1914.
2 SHEETS—SHEET 1.
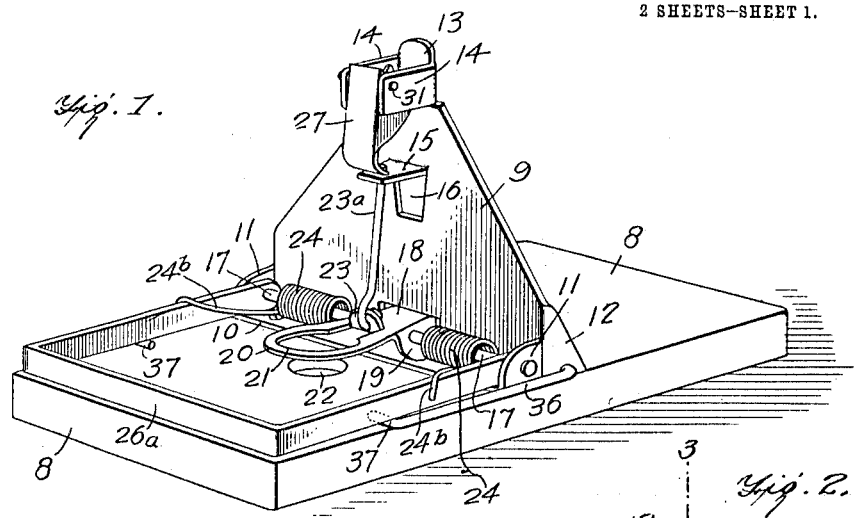
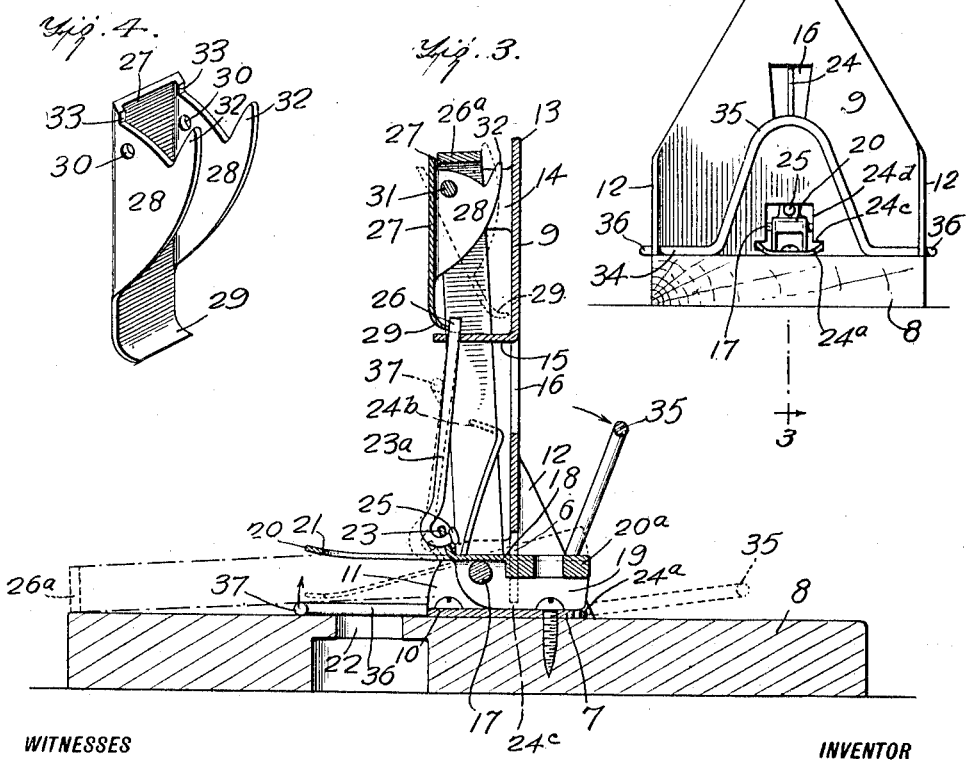
WITNESSES
INVENTOR
JOHN ENOS RUBY,
BY Munn & Co.
ATTORNEYS

J. E. RUBY.
ANIMAL TRAP.
APPLICATION FILED JUNE 25, 1913.

1,116,127.

Patented Nov. 3, 1914.
2 SHEETS—SHEET 2.

WITNESSES
L. H. Schmidt.
Walton Harrison

INVENTOR
JOHN ENOS RUBY,
BY Munn & Co.
ATTORNEYS

UNITED STATES PATENT OFFICE.

JOHN ENOS RUBY, OF INDIANAPOLIS, INDIANA.

ANIMAL-TRAP.

1,116,127. Specification of Letters Patent. Patented Nov. 3, 1914.

Application filed June 25, 1913. Serial No. 775,703.

*To all whom it may concern:*

Be it known that I, JOHN ENOS RUBY, a citizen of the United States, and a resident of Indianapolis, in the county of Marion and State of Indiana, have made a new and useful Improvement in Animal-Traps, of which the following is a specification.

My invention relates to animal traps of a kind suitable for killing rats and mice.

More particularly my invention comprehends a trap of this kind in which the trigger is rendered especially sensitive.

My invention further contemplates improvements in construction whereby various advantages are attained in connection with traps of this kind.

Reference is made to the accompanying drawings forming a part of this specification, and in which like letters indicate like parts.

Figure 5:
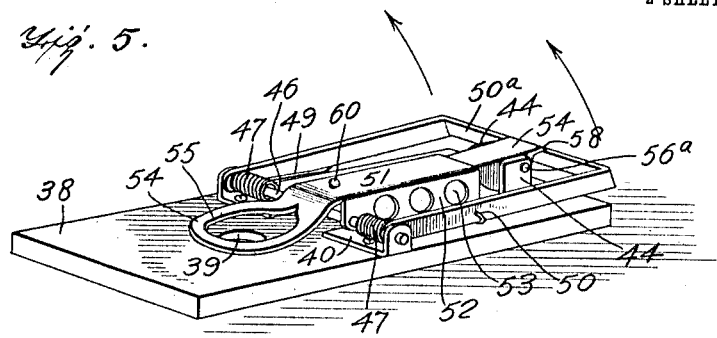
Figure 6:
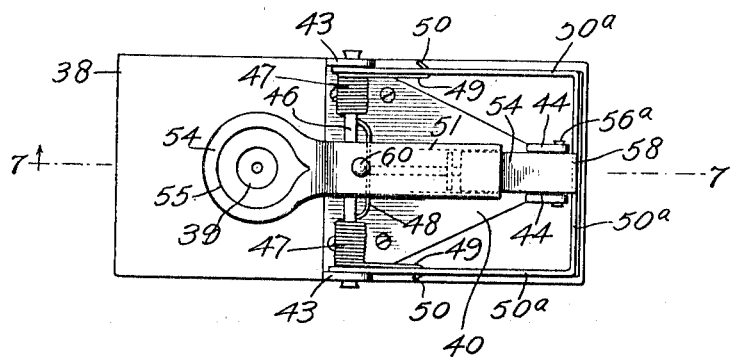
Figure 7:
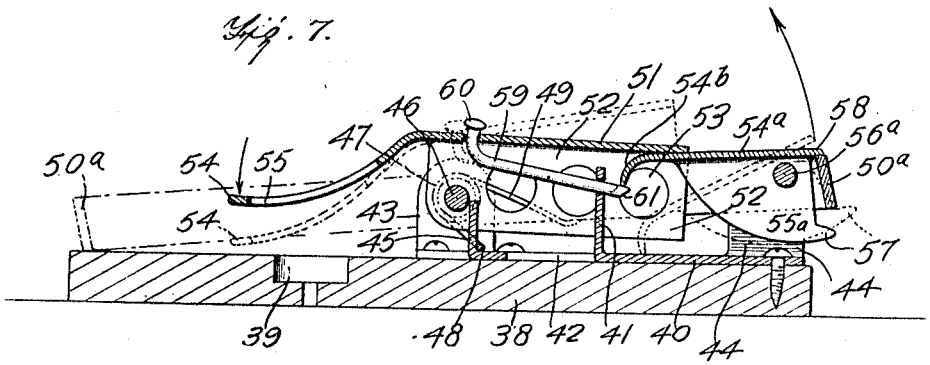

Figure 1 is a perspective showing one form of my trap. Fig. 2 is an end elevation of the trap. Fig. 3 is a longitudinal section on the line 3—3 of Fig. 2, looking in the direction of the arrow. Fig. 4 is a detail showing in perspective a dog used for holding the jaw while the trap is set. Fig. 5 is a perspective showing another form of my trap suitable more especially for mice. Fig. 6 is a plan view of the trap shown in Fig. 5, and, Fig. 7 is a section on the line 7—7 of Fig. 6, looking in the direction of the arrow.

Mounted upon a base board 8 is a vertically extending plate 9 having a portion 10 bent laterally to the general plane of the plate and secured upon the base board. The ends of the portion 10 are bent upwardly and formed into ears 11. The plate 9 is provided with triangular portions 12 bent in planes lateral to the general plane of the plate 9, and engaging the base board. The plate 9 is provided with a top portion 13, and with ears 14 integral with this top portion and extending parallel with each other. A tongue 15 is struck from the plate 9 and bent laterally away from the same so as to leave an opening 16. A shaft 17 extends through the ears 11 and practically across the trap. A trigger 18 is provided with ears 19 integral with it, these ears being journaled upon the shaft 11, so that the trigger may rock. The trigger 18 is provided with a portion 20, and with an opening 21 within said portion. The opening 21 is adjacent a hole 22, with which the base board is provided. This arrangement facilitates the fastening of bait upon the portion 20 of the trigger and leaves a little room for the bait to hang down without touching the base board. The trigger 18 is provided with an eye 23 integral with it and extending obliquely upward. A plunger pin $23^a$ extends through this eye and is provided with a head 25 engaging the eye. The plunger pin adjacent its head is bent, as indicated in Fig. 3. The upper end of the plunger is shown at 26, and extends through the tongue 15 which is provided with a hole for this purpose. Encircling the shaft 17 are two spiral springs 24 connected together by a portion of wire $24^a$ integral therewith and curved slightly. The springs 24 are also provided with portions $24^b$ of spring wire which extend away from the plate 9. A dog 27 made, in this instance, of sheet metal is provided with two lobes 28, and with a projecting tongue 29, this tongue being slightly curved and adapted to swing freely over the tongue 15, and to engage the upper end 26 of the plunger pin. The dog 27 is further provided with holes 30 (see Fig. 4) extending through the lobes 28, and a pin 31 carried by the ears 14 extends through the holes 30 in the lobes 28, and thus supports the dog 27. The weight of the lobes 28 tends to maintain the dog in such position that the tongue 29 occupies a position to the left of the end 26 of the plunger pin, according to Fig. 3. The lobes 28 are provided with two lugs 32 integral with them. A dog is further provided with a lip 33. A jaw $26^a$ having substantially a general U-form is journaled upon the shaft 17 and is engaged by the spring members $24^b$, which are always under tension from the springs 24. The pressure of the spring members $24^b$ upon the jaw $26^a$ tends to keep this jaw in the position indicated in Fig. 1. A setting lever 34 is provided with an arch portion 35 adapted to be engaged by the operator's foot in order to actuate the lever. This lever is further provided with portions 36, the latter having inwardly turned ends 37 which extend underneath adjacent portions of the jaw $26^a$.

When the several movable parts occupy their respective normal position, or in other words, when the trap is not set, the dog 27 hangs loosely. The jaw $26^a$ rests loosely upon the left end of the base board 8, according to Figs. 1 and 3, and the arch portion 35 of the foot lever extends obliquely upward to the right, as indicated in Fig. 3. The bait is secured to the trigger 20 in the usual or any other suitable manner.

In order to set the trap, the operator places his foot upon the arch portion 35 of the foot lever and presses downwardly so as to rock the foot lever, as indicated by dotted lines in Fig. 3. The portions 36 of the foot lever are thus rocked upwardly, and the inwardly extending ends 37 carry the jaw $26^a$ from its normal position to a position indicated by full lines in Fig. 3. The jaw $26^a$ in swinging upwardly engages the lip 33 and swings the dog 27 in a clock-wise direction, according to Fig. 3, so that the jaw passes the lip 33. If, for any reason, it should happen that the tongue 29 is toward the right instead of the left, of the end 26 of the plunger pin according to Fig. 3, the engagement of the jaw $26^a$ with the lip 33 as the jaw is swung upwardly into its new position, causes the dog 27 to rock in a clock-wise direction according to Fig. 3. This causes the dog 27 to glide past the end 26 of the plunger pin. Then when the jaw $26^a$, under spring tension as above explained, settles back against the lip 33, the tongue 29 engages the protruding end 26 of the plunger pin. The trigger 18 extends at its rear end through an opening 6 formed in the plate 9 by stamping a tongue or ear 7 therefrom, which ear is bent down and secured flush with the portion 10, and the trigger is provided with a weighted portion $20^a$ which normally holds the portion 20 at a suitable distance from the top of the base board. When, however, the portion 20 of the trigger is depressed, as by a rat trying to extricate bait from the trigger, the plunger pin $23^a$ is drawn downwardly and its end 26 is pulled out of engagement with the tongue 29. The dog 27, being thus released by the plunger pin, rocks in a contra-clock-wise direction according to Fig. 3, and the jaw $26^a$ is disengaged and is turned by spring pressure toward its normal position, thus killing the animal actuating the trigger. In practice, all that is necessary in order to set this form of the trap is to bait the trigger and press upon the arch portion 35 of the foot lever.

In the form shown in Figs. 5, 6 and 7, I provide a base board 38 having a bait hole 39. A metallic plate 40 is secured upon the base board, and is provided with an upturned tongue 41, and with an opening 42 from which this tongue is struck up. The plate 40 is further provided with ears 43—44 and with a tongue 45, the latter being bent up between the ears 43. A shaft 46 extends through the ears 43, and two spiral springs 47 encircle the shaft 46. The spiral springs 47 are connected together by a section 48 of spring wire integral therewith. The springs 47 are further provided with portions 49 of spring wire integral with them and extending away from the shaft 46, the portions 49 of spring wire are formed at their ends into hook members 50. A jaw, of substantially U-form as shown at $50^a$, is journaled upon the shaft 46. The trigger is shown at 51 and is provided with downwardly extending side walls 52, the latter being lightened to some extent by having holes 53 formed in them. The trigger 51 carries a forwardly extending portion 54, and is provided with an opening 55, the latter being directly over the bait hole 39 of the base board. The jaw $50^a$ is always under tension from the spiral springs 47. Extending through the ears 44 is a shaft $56^a$. A dog $54^a$ is mounted upon this shaft and is provided with a tongue $54^b$ extending slightly downward. The dog $54^a$ is further provided with two lobes $55^a$, the latter having lugs 57 integral with them. The dog is also further provided with a lever 58 projecting slightly and adapted to be engaged by the jaw $50^a$. A plunger pin is shown at 59 and extends through the hole in the trigger 51, and also through a hole in the tongue 41. The plunger pin is provided with a head 60 and with an end portion 61. Bait being fastened upon the portion 54 of the trigger 51, and the trigger being brought from the position indicated by dotted lines in Fig. 7 to the position indicated by full lines in said figure, the plunger pin 59 is thus moved in the general direction of its length to the right according to Fig. 7, and the tongue $54^b$ of the dog $54^a$ is caused to rest upon the end portion 61 of the plunger pin. The trap is thus set. Whenever an animal depresses the trigger 54, the plunger pin 59 is thus moved slightly in the direction of its general length to the left, according to Fig. 7, the end portion 61 being drawn out from under the tongue $54^b$. This releases the dog $54^a$, and the latter in turn disengages the jaw 50. This jaw being released and being under spring tension, as above described, leaps from the position indicated by full lines in Fig. 7 to the position indicated by dotted lines in said figure, thus killing the animal actuating the trigger.

The operation of my device is as follows: Bait being secured upon the trigger of either form of the trap, the trap is set as described and placed in a position favorable for enabling the rats or other animals to actuate the trigger.

It will be noted that in either form of the trap the trigger is rendered especially sensitive by the fact that the plunger pin ($23^a$ or 59) is very easily moved in the direction of its length. This is because the leverage of the trigger is thrown upon the plunger pin and the latter being thus moved endwise out of engagement with the dog 27 or 54ª, the jaw is released quickly and positively.

I do not limit myself to the precise construction shown, as variations may be made therein without departing from the spirit of my invention.

I claim:

1. In an animal trap, a movable dog, a movable pin automatically held in the path of said dog to limit the movement of the latter in one direction, a movable jaw adapted when moved into one position to automatically engage the dog to move the same against said pin for restraining the jaw, means for momentarily tripping the pin out of limiting position, said dog adapted when moved in a direction opposite to the pin limiting direction to momentarily move said pin to allow the passage of the dog and means carried by the dog adapted to be engaged by said jaw for moving the dog in last said direction.

2. In an animal trap, a movable dog, a detent, means for automatically holding the same to normally limit the movement of the dog in one direction, said dog having a curved portion to engage the detent when moved in the opposite direction for momentarily moving the detent to allow passage of the dog, a movable jaw adapted when moved into one position to automatically engage the dog and hold the same against the detent for restraining the jaw, and means adapted to be engaged by the jaw for moving the dog in said opposite direction, and means for momentarily tripping the detent.

3. In an animal trap, a dog, a detent, said dog movable into operative or inoperative positions with relation to the detent, said detent adapted to normally prevent the movement of the dog into inoperative position, a movable jaw, adapted when in one position to engage the dog and hold the same in position for restraining the jaw, spurs on the dog adapted to be engaged by the jaw for moving the dog in operative position, said dog provided with a curved portion adapted to momentarily move the detent to allow passage of the dog from inoperative to operative position, and means for momentarily tripping the detent.

4. In an animal trap, a movable dog, a detent, a pivoted trigger, having a weight on one end, said detent connected with said trigger and adapted to be moved thereby, said trigger adapted to automatically hold the detent in position to limit the movements of the dog in one direction, said dog having a portion adapted to engage the detent and momentarily move the same to allow passage of the dog in the opposite direction, a spring operated movable jaw, said jaw adapted to move into one position to automatically engage the dog and hold the same against the detent for restraining the jaw, and means adapted to be engaged by the jaw for automatically moving the said dog in said opposite direction.

5. An animal trap comprising a base board, a plate positioned thereon, said plate having outwardly bent ears, a dog pivoted between said ears, a movable pin, a tongue bent out from the plate through which the pin slides, a shaft supported by the plate, a trigger pivoted on said shaft, said trigger provided with a weight on one end thereof, said pin being connected to said trigger at the end opposite the weight, said pin adapted to limit the movement of the dog in one direction, a spring actuated jaw pivoted on said shaft, said jaw movable into position to engage said dog and for holding the same in pin limited position, said dog provided with a curved portion adapted to engage the pin for momentarily moving the same to allow passage of the dog into position to be limited by the pin, and spurs carried by the dog to be engaged by said jaw for moving the said curved portion into engagement with the pin.

JOHN ENOS RUBY.

Witnesses:
RUTH LEGG,
WILL E. BERNER.

Copies of this patent may be obtained for five cents each, by addressing the "Commissioner of Patents, Washington, D. C."